UNITED STATES PATENT OFFICE 2,346,941

AZO DYE INTERMEDIATES

William B. Reynolds, Chicago, Ill., assignor to E. I. du Pont de Nemours & Company, Wilmington, Del., a corporation of Delaware No Drawing. Original application September 6, 1941, Serial No. 409,832. Divided and this application February 25, 1942, Serial No. 432,246

4 Claims. (Cl. 260—510)

This invention relates to a new intermediate, 2,2'-dichlortolidine-5,5'-disulfonic acid. This case is a division of application Serial No. 409,832, filed September 6, 1941.

The dichlortolidine sulfonic acid used as a tetrazo component for the dyestuffs listed in the above-identified application is prepared as follows: Three hundred parts of 2,2'-dichlortolodine is gradually added to a mixture of 1000 parts of 100% sulfuric acid containing 32 parts of anhydrous sodium sulfate, at a temperature below 60° C. Then 525 parts of 65% oleum is added below 70° C. The mixture is warmed to 100° C., stirred for six hours at this temperature, cooled, and drowned on ice and water. 200 grams of sodium sulfate is added and sufficient calcium carbonate to neutralize the acid. The mixture is filtered. The filtrate is rendered acid to Congo red paper with concentrated hydrochloric acid and allowed to stand overnight before filtering. The desired product is obtained in excellent yields, and is probably the 5,5'-disulfonic acid, though not necessarily so.

The dichlortolidine disulfonic acid, when diazotized and coupled to azo dyestuff coupling components, yields colors of excellent properties. Any azo dyestuff coupling component is useful although variations in properties are observed in the products. The azo component may be coupled to two moles of the same coupling component or to one mole of one coupling component and another mole of a different coupling component. The dyes produced from this intermediate are represented by the formula:

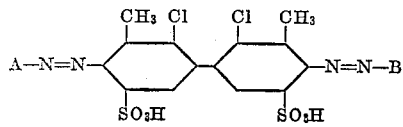

in which A and B represent azo dyestuff coupling components which may be the same or may be different. The sulfonic groups are shown in the 5,5' position for purposes of illustration. Coupling components of the phenylalkylpyrazolone series are particularly adapted to the production of useful dyes with this intermediate.

The intermediate has excellent properties for the making of azo dyes. It couples readily and yields a wide variety of shades with a variety of coupling components.

As many apparently widely different embodiments of this invention may be made without departing from the spirit and scope thereof, it is understood that the invention is not limited to the specific embodiments thereof except as defined in the appended claims.

I claim:

1. 2,2-dichlorotolidine disulfonic acid.

2. The process which comprises reacting 2,2'-dichlorotolidine with sulfuric acid and sodium sulfate at a temperature below 60° C., adding oleum at a temperature below 70° C., heating to about 100° C., adding sodium sulfate and calcium carbonate and isolating the product.

3. The process of producing 2,2'-dichlorotolidine disulfonic acid which comprises sulfonating dichlorotolidine with concentrated sulfuric acid at about 60° C., and isolating the product.

4. The process of producing 2,2'-dichlorotolidine disulfonic acid which comprises disulfonating 2,2'-dichlorotolidine in oleum at a temperature of about 100° C.

WILLIAM B. REYNOLDS.